(12) United States Patent
Carroll, II

(10) Patent No.: US 10,867,148 B2
(45) Date of Patent: Dec. 15, 2020

(54) CUSTOMIZABLE, PROGRAMMABLE CARD

(71) Applicant: Develop For LLC, Huntington, MD (US)

(72) Inventor: William F Carroll, II, Huntington, MD (US)

(73) Assignee: Develop For LLC, Huntington, MD (US)

( * ) Notice: Subject to any disclaimer, the term of this patent is extended or adjusted under 35 U.S.C. 154(b) by 0 days.

(21) Appl. No.: 16/784,233

(22) Filed: Feb. 6, 2020

(65) Prior Publication Data

US 2020/0257871 A1 Aug. 13, 2020

Related U.S. Application Data

(60) Provisional application No. 62/856,794, filed on Jun. 4, 2019, provisional application No. 62/803,488, filed on Feb. 9, 2019.

(51) Int. Cl.
*G06K 19/00* (2006.01)
*G06K 7/14* (2006.01)
*H04W 4/80* (2018.01)

(52) U.S. Cl.
CPC ............ *G06K 7/1417* (2013.01); *H04W 4/80* (2018.02)

(58) Field of Classification Search
CPC .............................. G06K 7/1417; H04W 4/80
USPC ........ 235/435, 439, 451, 454, 462, 487, 492
See application file for complete search history.

(56) References Cited

U.S. PATENT DOCUMENTS

| | | | |
|---|---|---|---|
| 8,960,532 B2 | 2/2015 | Zises | |
| 9,665,818 B1* | 5/2017 | Cardinal | ............ G06K 19/0704 |
| 9,767,452 B2 | 9/2017 | Khan et al. | |
| 10,007,664 B2 | 6/2018 | Donabedian et al. | |
| 2006/0281435 A1* | 12/2006 | Shearer | ................... H02J 50/20 |
| | | | 455/343.1 |
| 2014/0100925 A1* | 4/2014 | Popescu | ................. G06Q 30/01 |
| | | | 705/14.4 |
| 2018/0276518 A1* | 9/2018 | Benkley, III | ............ G06F 21/32 |

OTHER PUBLICATIONS

GitHub, "divan/txqr," https://github.com/divan/txgr.

* cited by examiner

*Primary Examiner* — Matthew Mikels
(74) *Attorney, Agent, or Firm* — Ramya Possett

(57) ABSTRACT

A customizable programmable card may comprise a set of visual indicators on a face of the card, wherein each one of the visual indicators indicates a functionality available for instantiation via the card; a short-range communication widget that comprises: a short range communication unit capable of transmitting data to a receiving entity; and a data store that comprises: a set of application identifiers, wherein each application identifier corresponds to one of the set of visual indicators; and, for each of the set of application identifiers, a corresponding set of application data to be used by a corresponding application associated with the application identifier, that causes the corresponding application to be instantiated on the receiving entity, wherein the corresponding set of application data are used as parameters for the instantiated corresponding application.

20 Claims, 7 Drawing Sheets

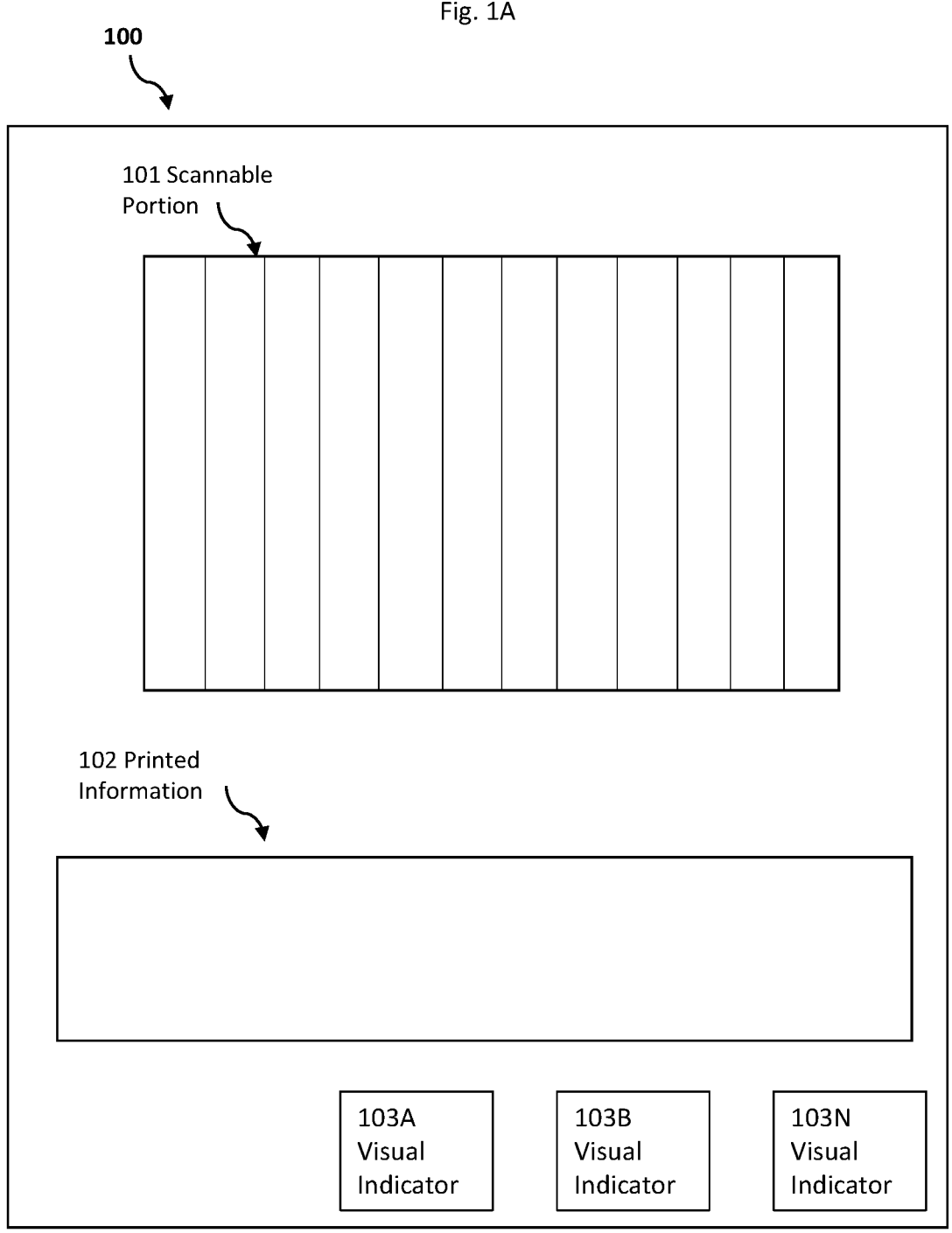

Fig. 8

624 PROVIDING, VIA THE SHORT RANGE COMMUNICATION SESSION, A SET OF APPLICATION IDENTIFIERS AND A SET OF APPLICATION DATA BY CAUSING THE CARD TO TRANSMIT NON-HUMAN DETECTIBLE AUDIO DATA TO THE RECEIVING DEVICE

625 USING AN ACCELEROMETER

626 DETECTING, BY AN ACCELEROMETER INCLUDED IN THE CARD, A MOVEMENT OF THE CARD

627 RESPONSIVE TO THE ACCELEROMETER DETECTING THE MOVEMENT OF THE CARD, CAUSING A SPEAKER INCLUDED IN THE CARD TO TRANSMIT THE AUDIO DATA

628 USING A SET OF PRESSURE SENSORS

629 DETECTING, BY THE SET OF PRESSURE SENSORS INCLUDED IN THE CARD, PRESSURE APPLIED TO THE CARD

630 RESPONSIVE TO THE SET OF PRESSURE SENSORS DETECTING THE PRESSURE APPLIED TO THE CARD, CAUSING A SPEAKER INCLUDED IN THE CARD TO TRANSMIT THE AUDIO DATA

631 CAUSING AN INDICATOR ON THE CARD TO PROVIDE AN EXTERNAL INDICATION THAT THE AUDIO DATA IS BEING TRANSMITTED

CUSTOMIZABLE, PROGRAMMABLE CARD

CROSS-REFERENCE TO RELATED APPLICATION

This application claims the benefit of U.S. Provisional Application No. 62/803,488 filed on Feb. 9, 2019, the entirety of which is incorporated by reference herein. This application further claims the benefit of U.S. Provisional Application No. 62/856,794 filed on Jun. 4, 2019, the entirety of which is incorporated by reference herein.

BACKGROUND

Human interactions are becoming increasingly digital. The ability to transfer data between two individuals is often restricted to determining a way to transfer data between the smart devices (e.g., phones, tablets, etc.) of the individuals. This is a time-consuming process and also incurs potential security risks as individuals connect their smart devices on a public network or enable a private connection between the two devices.

BRIEF DESCRIPTION OF THE DRAWINGS

The following detailed description references the drawings, wherein:

FIG. 1A is a block diagram depicting an example customizable, programmable card.

FIG. 8 is a flow diagram depicting an example method for instantiating functionality from the customizable, programmable card.

DETAILED DESCRIPTION

Figure 1:
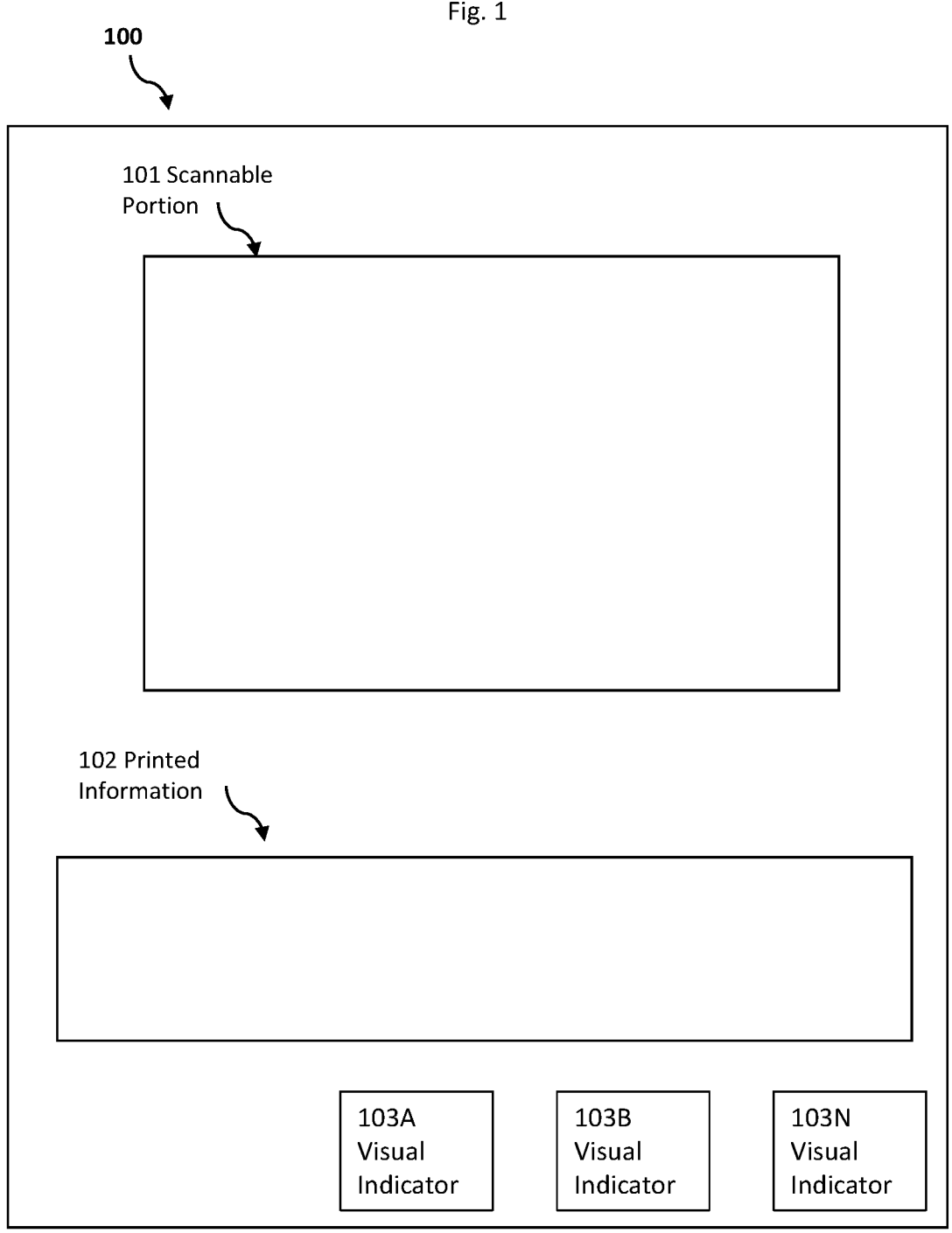
FIG. 1 is a block diagram depicting an example customizable, programmable card.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Human interactions are becoming increasingly digital. The ability to transfer data between two individuals is often restricted to determining a way to transfer data between the smart devices (e.g., phones, tablets, etc.) of the individuals. This is a time-consuming process and also incurs potential security risks as individuals connect their smart devices on a public network or enable a private connection between the two devices.

In one example, two individuals that meet may exchange business cards in order to exchange additional information about themselves. In order to digitize the data on those business cards, the individuals may have to manually enter the data into their smart devices. In some examples, the business card may include a Quick Response ("QR") code, that, when scanned, automatically creates a contact in an individual's phone. In another example, the individuals may exchange phones to manually enter in digital information, may connect on a public or private network to exchange data, may "airdrop" or otherwise engage in short range communication via their respective smart devices to exchange data, among other examples.

These examples are time-consuming, involve multiple steps, and/or potentially incur security issues when giving your smart device to another individual or enabling a network connection on your smart device with another smart device or public network.

Examples disclosed herein provide technical solutions to these technical challenges by providing a customizable programmable card that facilitates digital interaction. The solutions described herein enable the digital interaction of data between two individuals engaging in a human interaction.

The customizable, programmable card may enable digital interaction of data between two individuals and cause the instantiation of functionality on a receiving device of an individual. The card may include a set of visual indicators that indicate the functionality available on the card. Multiple different types of functionalities may be available for instantiation on a receiving device through the card. The card may also include a short-range communication widget that can transmit data that causes the multiple different types of functionalities to be instantiated on the receiving device. The short-range communication widget may include a data store that includes multiple application identifiers and application data associated with each of those application identifiers. The data transmitted via the card may include the set of application identifiers and associated data. The receiving device may be a smart device of an individual (like a mobile phone, tablet, laptop, etc.), another programmable card, and/or other device capable of receiving data through short range communication.

Some examples disclosed herein include a customizable, programmable card that includes a set of visual indicators on the face of the card and a short-range communication widget. The set of visual indicators may each indicate, for example, a functionality available for instantiation via the card. The shortrange communication widget may comprise a short-range communication unit capable of transmitting data to a receiving entity and a data store that includes a set of application identifiers, where each application identifier may correspond to one of the set of visual indicators. For each of the set of application identifiers, a corresponding set of application data may be used by a corresponding application associated with the application identifier. Interacting with the card may cause the corresponding application to be instantiated on the receiving entity, where the corresponding set of application data are used as parameters for the instantiated corresponding application.

Some examples disclosed herein include a customizable, programmable card that includes a low light readable substrate and a short-range communication widget. The short-range communication widget may comprise, for example, a short-range communication unit capable of transmitting data to a receiving entity, and a data store that includes a set of application identifiers, where each application identifier corresponds to a unique application. For each of the set of application identifiers, a corresponding set of application data may be used by a corresponding application associated with the application identifier. Interacting with the card may cause the corresponding application to be instantiated on the receiving entity, where the corresponding set of application data are used as parameters for the instantiated corresponding application.

Some of the examples disclosed herein enable a method of instantiating functionality from a customizable programmable card. The method of instantiating functionality from the customizable programmable card may include engaging, by the card, in a short range communication session with a receiving device; providing, via the short range communication session, a set of application identifiers and a set of application data, where each set of application data corresponds to an application identifier of the set of application identifiers; and causing, based on the provided set of application identifiers and the provided set of application data, a set of applications to be instantiated on the receiving device, wherein each application of the set of applications is instantiated with a corresponding set of application data as parameters for the instantiated application.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 2:
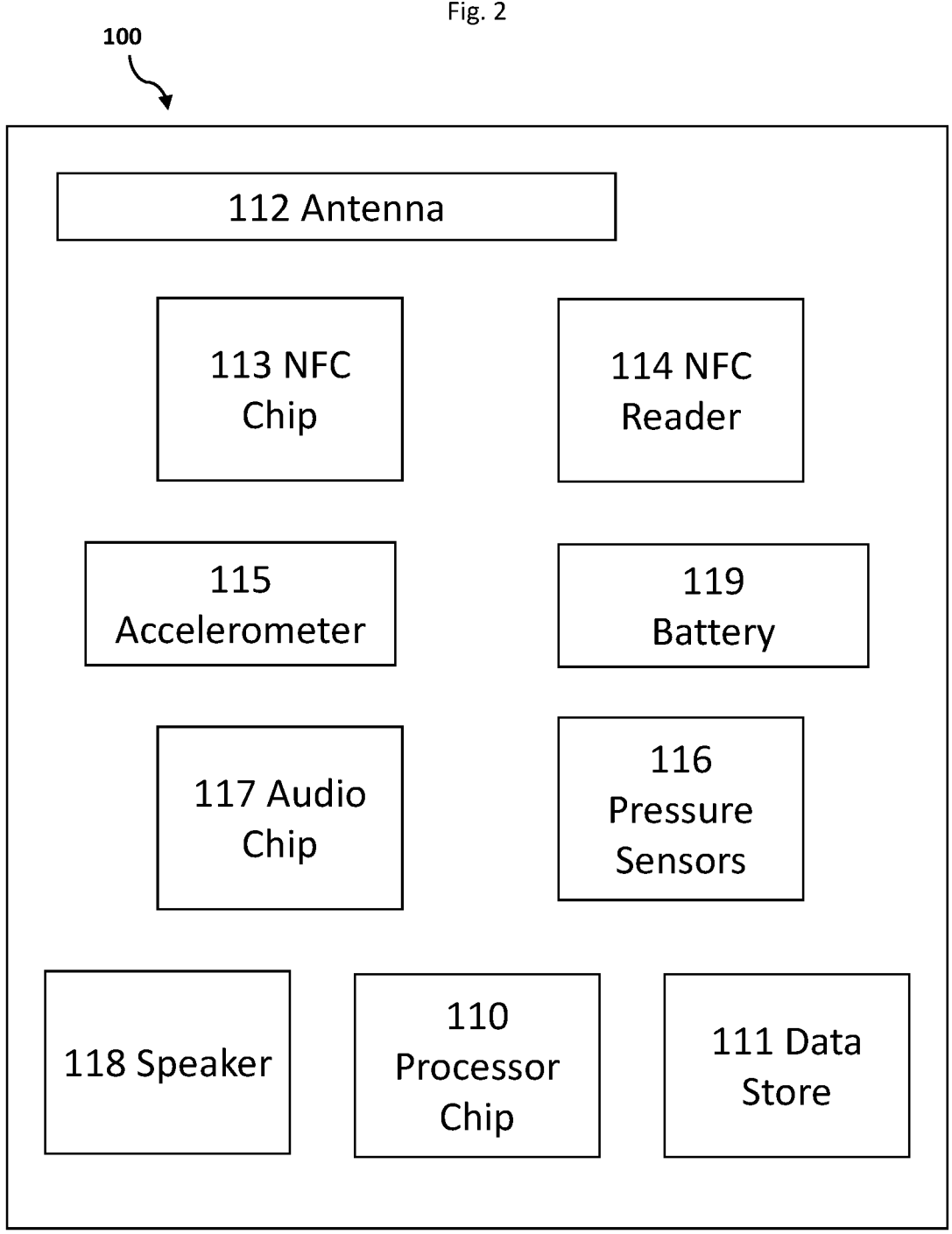
FIG. 2 is a block diagram depicting an example customizable, programmable card.
Figure 3:
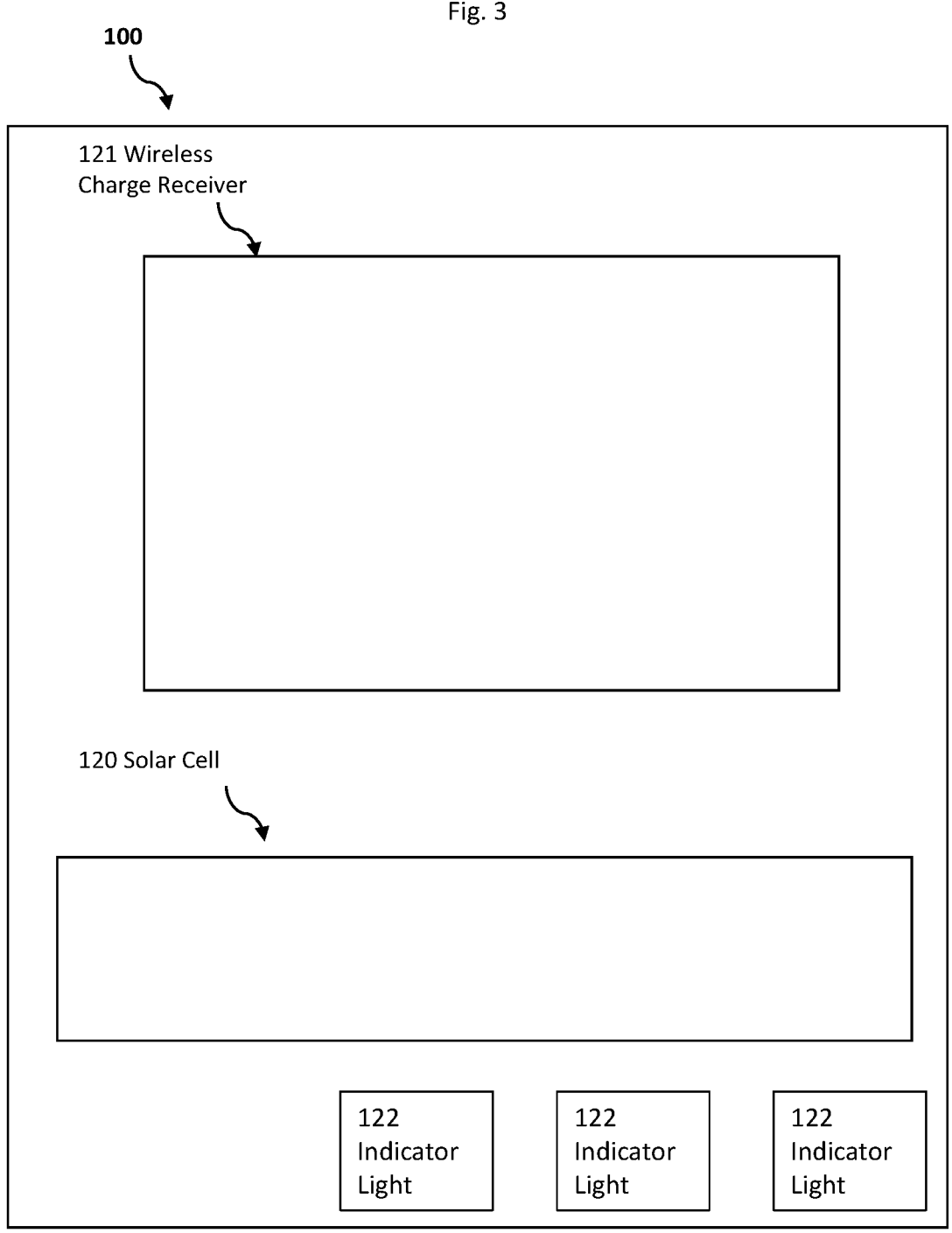
FIG. 3 is a block diagram depicting an example customizable, programmable card.

FIGS. 1-3 depict example block diagrams of a customizable, programmable card. In particular, FIG. 1 depicts an example block diagram of a face of a customizable, programmable card. FIG. 2 depicts an example block diagram of a cross-section of the customizable, programmable card. FIG. 3 depicts an example block diagram of the back of a customizable, programmable card.

FIG. 1 depicts an example block diagram of a face of a customizable, programmable card 100. The card 100 may include a scannable portion 101, printed information 102, a set of visual indicators 103A, 103B, . . . , 103N, and/or other data made available on the surface of the card. In some examples, the scannable portion 101 may comprise encoded data. The encoded data may be in QR code format, Near Field Communication ("NFC") format, and/or other format readable or transmittable via a short-range communication protocol. Examples of short-range communications include Bluetooth, infrared, NFC, ultraband, and Zigbee.

In some examples in which the scannable portion 101 is in a QR code format, the scannable portion may comprise information for multiple QR codes. For example, as shown in FIG. 1A, the scannable portion may comprise a pattern of QR codes. The example of sequential lines of encoded data, as depicted in FIG. 1A, is a non-limiting example of how multiple QR codes may be encoded in the scannable portion 101. In other examples, multiple QR codes may be encoded in a matrix fashion, in horizontal stripes, with one QR code embedded in one full half or one quarter of the scannable portion and other QR codes embedded in the remaining portions, etc. In some examples, moving the card at a particular angle may have the scannable portion 101 show a first QR code and moving the card at a second angle may have the scannable portion 101 show a second QR code separate from the first QR code. In some examples in which a substrate of the card may comprise an electronic paper substrate, the scannable portion 101 may be regularly updated to display different sets of encoded data related to multiple QR codes. In some examples, some or all of the multiple QR codes may represent one application identifier and a corresponding set of application data. In some examples, the multiple QR codes may each represent a unique application identifier and corresponding set of application data. The way in which multiple QR codes can be embedded in the scannable portion 101 is not limited to the examples described herein.

The printed information 102 may include contact information, business information, personal information, and/or other information that a user of the card would want printed on the card. The set of visual indicators 103A, 103B, . . . , 103N may comprise multiple visual indicators that indicate a functionality available for instantiation via the card. For example, visual indicators 103A could be an email icon, a contact icon, a social media icon (e.g., a Twitter®, Facebook®, Instagram®, Snap®, LinkedIn®, and/or other social media icon), a photo icon, an audio icon (e.g., an icon that could indicate audio information is to be transmitted and played), an app icon (e.g., indicating an application on the receiving device is to be instantiated and executed to run the data to be transmitted from the card 100), an icon that indicates engagement with a smart device (e.g., a smart assistant, an IoT connected device, and/or other smart device), and/or other visual indicator that indicates a functionality to be instantiated and/or executed by a receiving device. Each visual indicator 103A, 103b, . . . , 103N may be a same or different visual indicator from each other visual indicator. In some examples, the set of visual indicators 103A, 103b, . . . , 103N may also indicate an order in which functionality may be instantiated on the receiving device.

FIG. 2 depicts an example block diagram of a cross-section of the customizable, programmable card 100.

The customizable, programmable card 100 may include a processor chip 110, a data store 111, an antenna 112, and/or other components that may enable the digital interaction between the card 100 and a receiving device. For example, the card may also include a Near Field Communication ("NFC") chip 113, a NFC reader 114, an accelerometer 115, a set of pressure sensors 116, a sound chip 117, a speaker 118, a battery 119, and/or other components.

Figure 4:
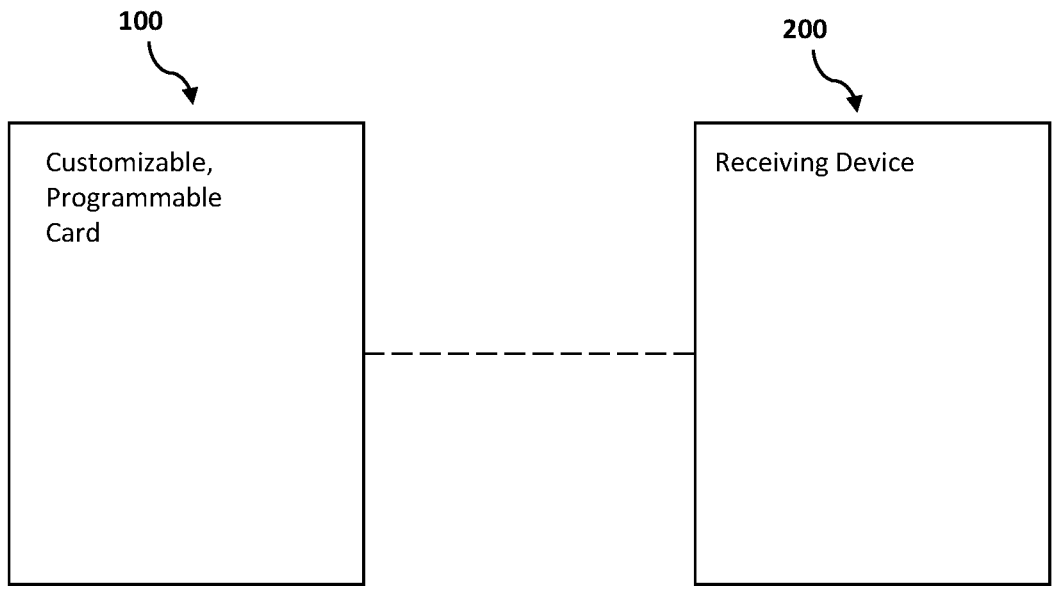
FIG. 4 is a block diagram depicting an example environment in which various examples may be implemented with the customizable, programmable card.

The NFC chip 113 and NFC reader 114 may transmit data from the data store 111 to a receiving entity (e.g., a receiving device 200 of FIG. 4). The accelerometer 115 may detect movement of the card 100. The set of pressure sensors 116 may comprise one or more sensors that detect squeezing or pressure applied to a surface of the card. The sound chip 117 and the speaker 118 may translate the data in the data store 111 to audio data and emit the audio data from the card 100. In some examples, the sound chip 117 may translate the data in the data store 111 to non-human detectible audio data. The battery 119 may store power that enables the components of the card 100 to function.

In some examples, some or all of these components may be included in the customizable, programmable card 100. For example, in some examples, the customizable, programmable card 100 may include the accelerometer 115, sound chip 117, speaker 118, NFC reader 113, and NFC chip 114. In other examples, the card 100 may comprise a set of pressure sensors, the accelerometer 115, the sound chip 117, and the speaker 118, and the battery 119. The examples described herein are merely examples and not limiting to the different combinations of components that might be included in the customizable, programmable card 100.

The data store 111 may comprise data related to engaging in digital interaction via the card 100. For example, the data store 111 may comprise a set of application identifiers and a corresponding set of application data. The set of application identifiers may each identify a particular application to be instantiated on a receiving device. The applications to be instantiated may each be unique from each other. In some examples, at least a first and second application are unique from each other. The application identifiers may relate to the set of visual indicators 103A, 1038, . . . , 103N described above. In some examples, each application identifier may correspond to a unique one of the set of visual indicators 103A, 103B, . . . 103N. In some examples, the data store 111 may also store an order in which the application identifiers and corresponding set of application data are transmitted from the card 100, in order to control an order or sequence of functionality that is instantiated on the receiving device.

In some examples, the corresponding set of application data may comprise the parameters and data to be used after the application may be instantiated. For example, an application identifier may be an audio application and the corresponding set of application data may comprise a set of songs to play via the audio application. In another example, the application identifier may comprise a social media application and the set of corresponding application data may facilitate connecting with an individual associated with the receiving device on the social media application. The types of applications and corresponding sets of application data are not limited to the examples described herein.

In some examples, the corresponding set of application data may comprise a program or set of programs to be executed on the instantiated application. For example, the data store 111 may store, for each set of application data, a program that is appended to an Uniform Resource Identifier or Base64 string that may be encoded into a QR code, audio data, or NFC data.

In some examples, for one application identifier, the corresponding set of application data may comprise a program, and for another application identifier, the corresponding set of application data may comprise the parameters and data to be used after the application is instantiated. In some examples, the first application identifier and corresponding set of application data may comprise an authentication protocol to authenticate the card 100 to the receiving device (and/or vice versa). In some examples, the first application identifier and set of corresponding application data may facilitate engagement of an encrypted communication protocol which may enable secure communication between the card 100 and the receiving device.

In some examples, the combination of the NFC chip 113, the NFC reader 114, and the data store 111 may be considered a short range communication widget of the card 100 that transmits data from the card 100 to a receiving entity and enables digital communication with that receiving entity. In other examples, the scannable portion 101 and the data store 111 may be considered a short-range communication widget of the card 100. In yet other examples, the sound chip 117, speaker 118, and data store 111 may be considered a short-range communication widget of the card 100. In some examples, the antenna 112 of the card 100 may also be considered as part of the short-range communication widget.

FIG. 3 depicts an example block diagram of a back of the customizable, programmable card 100.

The back of the customizable, programmable card 100 may include, for example, a solar cell 120, a wireless charge receiver 121, a set of indicator lights 122, and/or other components that may enable the digital interaction between the card 100 and a receiving device. In some examples, the back of the customizable, programmable card 100 may be blank. In other examples, the back of the card 100 may have a similar set of components as the face of the card 100.

The solar cell 120 may retain power and may charge using ambient light sources and/or solar light sources. The wireless charge receiver 121 may cause the transmission of power from the card 100 to a receiving device. The set of indicator lights 122 may comprise one or more lights embedded on a surface of the card 100 that are turned on when data is being transmitted from the card 100 to a receiving device. In some examples, the set of indicator lights 122 may only be included in examples in which the audio chip 117 and speaker 118 are included in the card. In these examples, the set of indicator lights 122 may be turned on while the speaker 118 emits audio data from the card 100.

The substrate of the card 100 may be a wooden substrate, a photo luminescent substrate, an electronic paper ("e-paper") substrate, a metal substrate, a bamboo substrate, a pvc substrate, a plastic substrate readable in low light settings, any combination thereof, and/or another substrate that may enable the inclusion of the components within the card 100 and the elements on the front and back of the card 100.

In some examples, the substrate may comprise some or all sustainable materials. In some examples, for a metal substrate, the card 100 may comprise a center that is hollow with plastic around the NFC chip 113 so that the metal substrate of the card does not block a signal of the NFC chip 113.

In some examples in which the card 100 may comprise a photoluminescent e-paper substrate, the substrate may be able to change pixel light based on electrical current that is passed through the substrate. In some of these examples, the photoluminescent layer may be directly below a surface of the substrate on which the scannable portion 101, the printed information 102, and the set of visual indicators 103A, 1038, . . . , 103N resides. In some of these examples, the substrate may have an ability to charge the luminescent paper base from surrounding light sources and may emit light from its charge in low light settings. In some examples, the substrate may have a glow-in-the-dark characteristic.

The dimensions of the card may have a width ranging generally from 2 to 2.25 inches, a height ranging generally from 3.25 to 3.5 inches, and a depth or thickness ranging generally from 0.07 to 1.1 inches. The shape of the card may be rectangular, oblong, rectangular with rounded edges, and/or generally the shape of a business card used by individuals to convey their professional contact information.

Processor chip 110 may be at least one central processing unit (CPU), microprocessor, and/or other hardware device suitable for retrieval, execution, and/or transmittal of data stored in data storage 111.

Data store 111 can be any non-transitory machine-readable storage. In some examples, data store 111 can comprise an Solid State Drive (SSD), Hard Disk Drive (HDD), a flash drive, an EEPROM, a memory chip, random access memory, read-only memory, cache memory, optical disk, and/or other type of data store that stores data related to the customizable, programmable card 100. In some examples, the data store 111 may be immutable.

According to various implementations, customizable, programmable card 100 and the various components described herein may be implemented in hardware and/or a combination of hardware and programming that configures hardware. Furthermore, in FIGS. 1-3 and other Figures described herein, different numbers of components or entities than depicted may be used.

FIG. 4 depicts a block diagram depicting an example environment in which various examples may be implemented with the customizable, programmable card. In some examples, an environment may include various components including the customizable, programmable card 100 and a receiving device 200. Receiving device 200 may comprise a mobile phone, an electronic book reader, a tablet computing device, a laptop computing device, a desktop computing device, an all-in-one computing device, a thin client, a workstation, a network-enabled appliance such as a "Smart" television or digital assistant, and/or other electronic device suitable for receiving data and executing functionality based on the received data. Receiving device 200 may include a physical processor and a data store capable of storing the data received from the card 100. In these examples, the customizable, programmable card 100 may transmit data to and cause instantiation of functionality on the receiving device 200 by shaking the card 100 within a predetermined proximity of the receiving device 200, by applying a predetermined amount of pressure to a surface of the card 100, by placing the card 100 within a predetermined distance of the receiving device 200, by having the receiving device 200 scan a surface of the card 100, and/or in other manners of direct or indirect contact between the card 100 and the receiving device 200.

In examples in which the card 100 was within a predetermined distance of the receiving device 200, the receiving device 200 may engage in a short-range communication session. For example, the card 100 may transmit the data in the data store 111 via near field communication, causing the corresponding applications to be instantiated on the receiving device 200. In other examples, the card 100 may transmit the data in the data store 111 by having the receiving device scan the scannable portion 101 of the card. In some of these examples, the card 100 may transmit multiple QR codes via the scannable portion 101, causing the corresponding applications to be instantiated on the receiving device 200. For example, the scannable portion 101 may have multiple patterns of encoded QR codes within the scannable portion, as depicted in FIG. 1A. In another example, the scannable portion 101 may depict a rotating set of QR codes, where each QR code encodes data related to a subset of application identifiers and corresponding sets of application data in the data store 111. The receipt of the data via scanning the scannable portion 101 may cause the corresponding applications to be instantiated on the receiving device 200.

In examples in which the card 100 was being shaken or having pressure applied to, the card 100 and the receiving device may engage in a short-range communication session. For example, the card 100 may cause the audio chip 117 to translate the data in the data store 11 to non-human detectible audio data and transmit it via the speaker 118 as audio waves to be received by the receiving device 200, causing the applications identified in the data store 111 to be instantiated on the receiving device 200.

Figure 5:
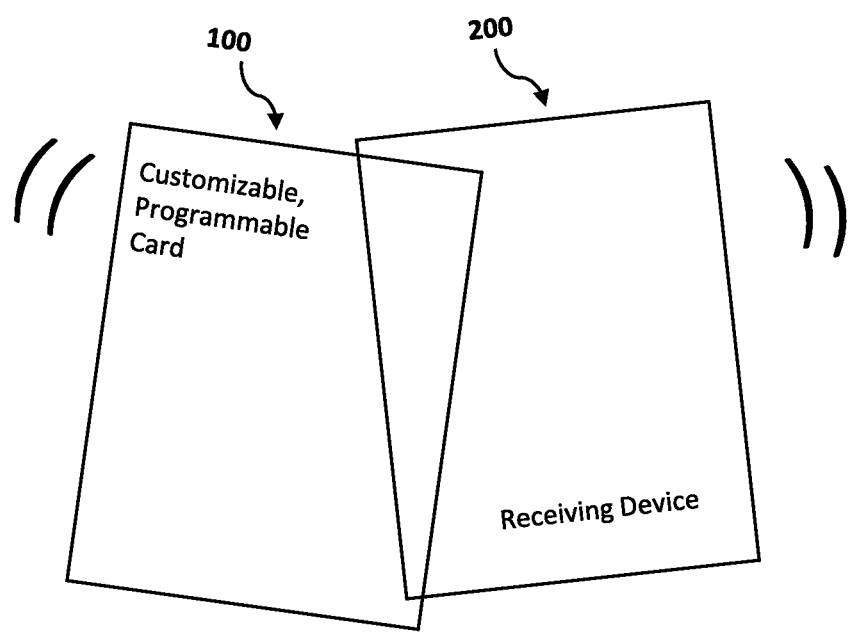
FIG. 5 is a block diagram depicting an example environment in which various examples may be implemented with the customizable, programmable card.

FIG. 5 depicts a block diagram depicting an example environment in which various examples may be implemented with the customizable, programmable card. In some examples, an environment may include various components including the customizable, programmable card 100 and a receiving device 200. Receiving device 200 may comprise a customizable, programmable device, and/or other electronic device suitable for receiving data and executing functionality based on the received data. Receiving device 200 may include a physical processor and a data store capable of storing the data received from the card 100.

In these examples, the customizable programmable card 100 may initiate contact the receiving device 200 by direct contact between the customizable, programmable card 100 and the receiving device 200, by shaking the card 100 and the receiving device 200 within a predetermined proximity of one another (as depicted in FIG. 5), by having the card 100 and the receiving device 200 apply a predetermined amount of pressure to each other while in direct contact, and/or in other manners of direct or indirect contact between the card 100 and the receiving device 200. For example, after initiating contact with the receiving device 200, card 100 may engage in transmission and instantiation of functionality on receiving device 200 in a manner the same as or similar to that described with regard to FIG. 4.

Figure 6:
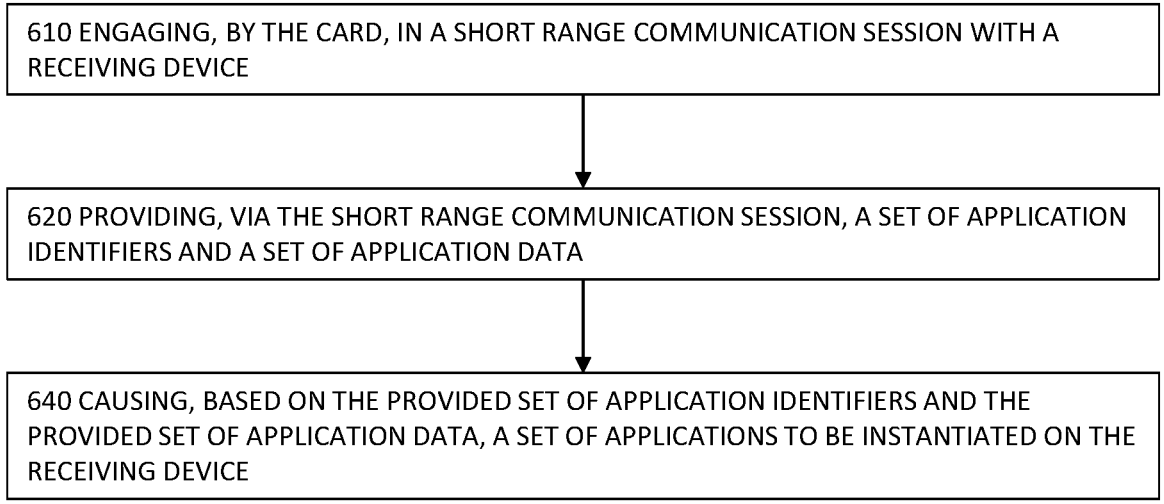
FIG. 6 is a flow diagram depicting an example method for instantiating functionality from the customizable, programmable card.

FIG. 6 is a flow diagram depicting an example method 300 for instantiating functionality from a customizable, programmable card. The various processing blocks and/or data flows depicted in FIG. 6 (and in the other drawing figures described herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 600 as illustrated (and described in greater detail below) is meant to be an example and, as such, should not be viewed as limiting. Method 600 may be implemented in the form of executable instructions stored on a machine-readable storage medium, such as data store 111, and/or in the form of electronic circuitry.

In block 610, method 600 may include engaging, by the card, in a short-range communication session with a receiving device. Referring to FIG. 1, the customizable, programmable card 100 may be responsible for implementing block 610.

In block 620, method 600 may include providing, via the short-range communication session, a set of application identifiers and a set of application data, where each set of application data corresponds to an application identifier of the set of application identifiers. Referring to FIG. 1, the customizable, programmable card 100 may be responsible for implementing block 620.

Figure 7:
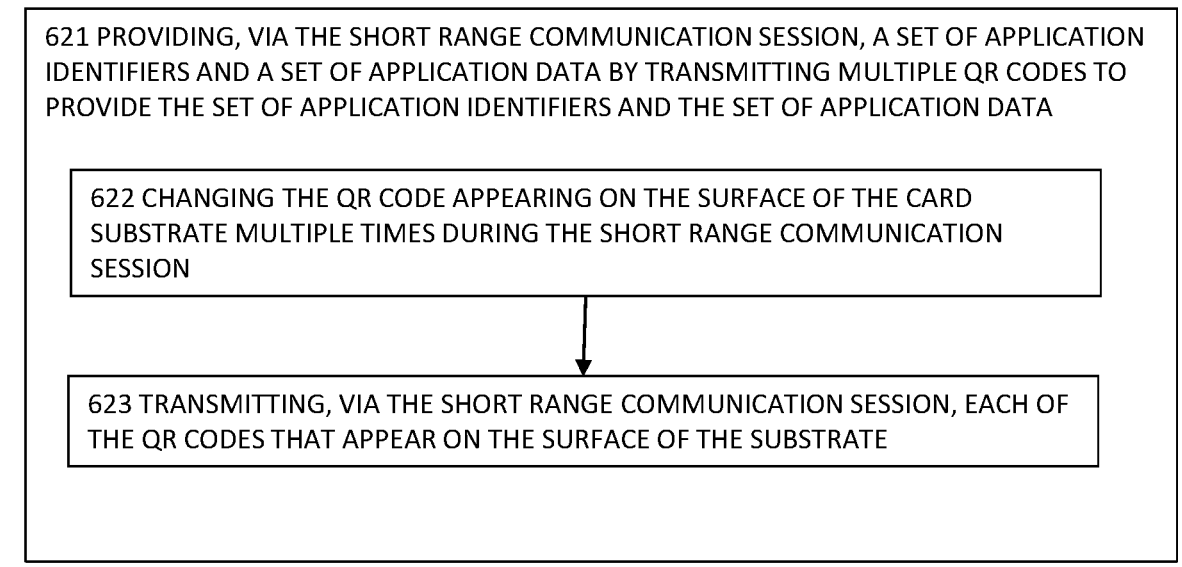
FIG. 7 is a flow diagram depicting an example method for instantiating functionality from the customizable, programmable card.

In some examples, as shown in FIG. 7, block 620 of FIG. 6 may be further implemented as block 621 of FIG. 7, where block 621 may comprise transmitting multiple QR codes to provide the set of application identifiers and set of application data.

In block 622 of FIG. 7, method 600 may include changing the QR code appearing on the surface of the substrate multiple times during the short-range communication session. Referring to FIG. 1, the customizable, programmable card 100 may be responsible for implementing block 622.

In block 623 of FIG. 7, method 600 may include transmitting, via the short-range communication session, each of the QR codes that appear on the surface of the substrate. Referring to FIG. 1, the customizable, programmable card 100 may be responsible for implementing block 623.

In other examples, as shown in FIG. 8, block 620 of FIG. 6 may be further implemented as block 624 of FIG. 8, where block 624 may comprise transmitting the set of application identifiers and the set of application data as audio data.

In block 624 of FIG. 8, method 600 may include causing the card to transmit non-human detectible audio data to the receiving device. Referring to FIG. 1, the customizable, programmable card 100 may be responsible for implementing block 624.

In some of these examples, block 625 of FIG. 8 may be performed using an accelerometer. As seen in block 626 of FIG. 8, method 600 may include detecting, by an accelerometer included in the card, a movement of the card. Referring to FIG. 1, the customizable, programmable card 100 may be responsible for implementing blocks 625 and 626.

In block 627 of FIG. 8, method 600 may include responsive to the accelerometer detecting the movement of the card, causing a speaker included in the card to transmit the audio data. Referring to FIG. 1, the customizable, programmable card 100 may be responsible for implementing block 627.

In others of these examples, block 628 of FIG. 8 may be performed using a set of sensors. In block 629 of FIG. 8, method 600 may include detecting, by a set of sensors included in the card, pressure applied to the card. Referring to FIG. 1, the customizable, programmable card 100 may be responsible for implementing blocks 628 and 629.

In block 630 of FIG. 8, method 600 may include responsive to the set of sensors detecting the pressure, causing a speaker included in the card to transmit the audio data. Referring to FIG. 1, the customizable, programmable card 100 may be responsible for implementing block 630.

In block 631, method 600 may include causing an indicator on the card to provide an external indication that the audio data is being transmitted. Referring to FIG. 1, the customizable, programmable card 100 may be responsible for implementing block 636.

Returning to FIG. 6, in block 640, method 600 may include causing, based on the provided set of application identifiers and the provided set of application data, a set of applications to be instantiated on the receiving device, wherein each application of the set of applications is instantiated with a corresponding set of application data as parameters for the instantiated application. Referring to FIG. 1, the customizable, programmable card 100 may be responsible for implementing block 640.

The foregoing disclosure describes a number of example implementations for enabling digital interaction. The disclosed examples may include systems, devices, computer-readable storage media, and methods for enabling digital communication. For purposes of explanation, certain examples are described with reference to the components illustrated in FIGS. 1-8. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 6-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A customizable programmable card comprising:
   a set of visual indicators on a face of the card, wherein each one of the visual indicators indicates a functionality available for instantiation via the card;
   a short-range communication widget comprising:
      a short-range communication unit capable of transmitting data to a receiving entity; and
      a data store comprising:
         a set of application identifiers, wherein each application identifier corresponds to one of the set of visual indicators; and
         for each of the set of application identifiers, a corresponding set of application data to be used by a corresponding application associated with the application identifier, that causes the corresponding application to be instantiated on the receiving entity, wherein the corresponding set of application data are used as parameters for the instantiated corresponding application.

2. The card of claim 1, wherein the set of application identifiers comprises:
   a first application identifier to be used by a first application; and
   a second application identifier to be used by a second application that is unique from the first application.

3. The card of claim 1,
   wherein the set of application data comprises a first set of application data corresponding to a first application identifier of the set of application identifiers, and
   the first application data comprises a set of instructions and a set of parameters that cause multiple functionalities to be instantiated by a first application corresponding to the first application identifier.

4. The card of claim 1, wherein the short-range communication unit comprises a QR code embedded on a surface of the card, the QR code comprising:
   multiple sets of encoded data, wherein each set of encoded data comprises a subset of encoded data, and
   the subset of encoded data comprises:
      a set of encoded data comprising one of the set of application identifiers; and
      one or multiple sets of encoded data comprising one of the set of application data corresponding to the application identifier.

5. The card of claim 1, wherein the short-range communication unit comprises:
a speaker; and
one or more of:
an accelerometer; or
a set of pressure sensors that detect pressure applied to the card,
wherein the set of application identifiers and corresponding set of application data comprise non-human detectible audio data.

6. The card of claim 1, comprising:
a substrate that is readable in low light settings.

7. A method of instantiating functionality from a customizable programmable card, the method comprising:
engaging, by the card, in a short-range communication session with a receiving device;
providing, via the short-range communication session, a set of application identifiers and a set of application data, where each set of application data corresponds to an application identifier of the set of application identifiers; and
causing, based on the provided set of application identifiers and the provided set of application data, a set of applications to be instantiated on the receiving device, wherein each application of the set of applications is instantiated with a corresponding set of application data as parameters for the instantiated application.

8. The method of claim 7, wherein the set of application identifiers comprises:
a first application identifier to be used by a first application, and
a second application identifier to be used by a second application that is unique from the first application.

9. The method of claim 7, wherein the set of application data comprises a first set of application data corresponding to a first application identifier of the set of application identifiers, and
the first set of application data comprises a set of instructions and a set of parameters that cause multiple functionalities to be instantiated by a first application corresponding to the first application identifier.

10. The method of claim 7, wherein the card comprises a substrate comprising a QR code embedded on a face of the substrate,
the method further comprising:
changing the QR code appearing on the surface of the substrate multiple times during the short-range communication session;
transmitting, via the short-range communication session, each of the QR codes that appear on the surface of the substrate; and
causing multiple functionalities to be instantiated on the receiving device based on the set of application identifiers and the set of application data, encoded in the multiple QR codes transmitted via the short-range communication session.

11. The method of claim 10,
wherein the substrate is a low light readable substrate, and
wherein the method further comprises:
charging the low light readable substrate from ambient light sources;
emitting light from the low light readable substrate in low light settings; and
enabling scanning of the QR code in low light settings based on the emitted light.

12. The method of claim 7,
wherein the receiving entity is a second programmable card, and
wherein engaging in the short-range communication session comprises:
detecting interaction between the customizable programmable card and the second programmable card.

13. The method of claim 12, wherein causing the interaction comprises one or more of:
detecting the interaction based on a physical contact between the customizable programmable card and the second programmable card; or
causing the customizable programmable card to transmit the set of application identifiers and the corresponding set of application data via an audio data transmission.

14. The method of claim 7, wherein engaging in the short-range communication session comprises:
causing the card to transmit non-human detectible audio data to the receiving device; and
causing an indicator on the card to provide an external indication that the audio data is being transmitted,
wherein the audio data comprises the set of application identifiers and the corresponding set of application data.

15. The method of claim 14, wherein causing the card to transmit the non-human detectible audio data comprises:
detecting, by an accelerometer included in the card, a movement of the card; and
responsive to the accelerometer detecting the movement of the card, causing a speaker included in the card to transmit the audio data.

16. The method of claim 14, wherein causing the card to transmit the non-human detectible audio data comprises:
detecting, by a set of sensors included in the card, pressure applied to the card; and
responsive to the set of sensors detecting the pressure, causing a speaker included in the card to transmit the audio data.

17. The method of claim 7,
wherein the card comprises a solar cell embedded into a surface of a substrate of the card;
the method further comprising:
charging the solar cell using ambient light; and
causing charging of the receiving device using the solar cell of the card.

18. A customizable programmable card comprising:
a low light readable substrate; and
a short-range communication widget comprising:
a short-range communication unit capable of transmitting data to a receiving entity; and
a data store comprising:
a set of application identifiers, wherein each application identifier corresponds to a unique application; and
for each of the set of application identifiers, a corresponding set of application data to be used by a corresponding application associated with the application identifier, that causes the corresponding application to be instantiated on the receiving entity, wherein the corresponding set of application data is used as parameters for the instantiated corresponding application.

19. The customizable programmable card of claim 18, wherein the short-range communication widget comprises:
one or more of: an accelerometer, or a set of sensors that detect pressure applied to the card;

and wherein the set of application identifiers and the corresponding set of application data comprise non-human detectible audio data.

20. The customizable programmable card of claim 18, wherein the data store comprises:
multiple sets of QR codes,
wherein each set of QR codes comprises one set of the sets of application identifiers and corresponding sets of application data.

* * * * *